United States Patent [19]

Nakayama et al.

[11] 4,385,086

[45] May 24, 1983

[54] METHOD FOR PREVENTING LEACHING OF CONTAMINANTS FROM SOLID SURFACES

[75] Inventors: Muneo Nakayama, Tokyo; Hisashi Nakane, Kawasaki; Akira Yokota, Yamato; Shingo Asaumi, Fujisawa, all of Japan

[73] Assignee: Tokyo Ohka Kogyo Kabushiki Kaisha, Kawasaki, Japan

[21] Appl. No.: 100,930

[22] Filed: Dec. 6, 1979

[30] Foreign Application Priority Data

Dec. 7, 1978 [JP] Japan .................................. 53-151841
Aug. 13, 1979 [JP] Japan .................................. 54-102994

[51] Int. Cl.$^3$ ............................................. B05D 3/02
[52] U.S. Cl. ...................................... 427/387; 427/82; 427/95; 427/397.7
[58] Field of Search ................... 427/95, 82, 226, 387, 427/397.7; 65/60 D; 428/428

[56] References Cited

U.S. PATENT DOCUMENTS

| | | | |
|---|---|---|---|
| 3,556,841 | 1/1971 | Iwasa et al. | 427/95 |
| 3,925,583 | 12/1975 | Rau et al. | 428/428 |
| 3,927,697 | 12/1975 | Baumler et al. | 428/428 |
| 4,041,190 | 8/1977 | Dubois et al. | 427/95 |
| 4,107,388 | 8/1978 | Gambaretto | 65/60 D |
| 4,277,525 | 7/1981 | Nakayama et al. | 427/387 |

FOREIGN PATENT DOCUMENTS

| | | | |
|---|---|---|---|
| 661372 | 4/1963 | Canada | 427/387 |
| 7114847 | 5/1972 | Netherlands | 427/226 |
| 885118 | 12/1961 | United Kingdom | 427/95 |

*Primary Examiner*—John D. Smith
*Attorney, Agent, or Firm*—Brisebois & Kruger

[57] ABSTRACT

An efficient method is proposed for preventing leaching of contaminants from the surface of a solid, such as sodium ions from the surface of soda glass or nickel, chromium or iron from the surface of stainless steel in order to minimize detrimental contamination of highly pure substances in contact with the solid surface.

The effect is basically obtained by providing a coating film of oxidized silicon on to the solid surface and the coating film is formed by applying a coating solution containing a hydroxysilane compound to the surface followed by baking of the coating layer at a temperature not lower than 150° C., the coating solution being prepared by the equilibration reaction of an alkoxysilane with a carboxylic acid and an alcohol, of an acyloxysilane with an alcohol, or of an alkoxysilane with water in an alcohol where the molar ratios of the individual reactants are in the specified ranges.

8 Claims, No Drawings

METHOD FOR PREVENTING LEACHING OF CONTAMINANTS FROM SOLID SURFACES

BACKGROUND OF THE INVENTION

The present invention relates to a method for preventing leaching of contaminants from the surface of a solid or, in particular, to a method for preventing contamination of a material in contact with a solid such as a glass, ceramic, metal and the like by the ingredients leached out of the surface of the solid.

In various kinds of fine technologies such as the manufacture and processing of semiconductors or semiconductor devices, preparation and storage of medicines and microanalytical procedures, it is of utmost importance to avoid contamination of the materials or chemicals under handling by trace amounts of impurities, especially, such as alkali metals originating in the solid surface with which the material or the chemical in question is in contact. For example, contamination with an alkali metal element is unavoidable when the material or chemical is contained in a vessel or handled with a tool made of a glass because containers for photoresist materials, glass bottles for reagents and medicines, ampules, beakers and flasks made of glass cannot be free from the problem of exudation or leaching out of the ingredients of the glass such as alkali metals so that the chemicals contained in such vessels are always subject to contamination with an alkali metal. In the manufacture of semiconductors, in particular, contamination with a trace amount of alkali metal ions may sometimes be very detrimental for the performance of the semiconductor produced under the contamination.

Most of the glass vessels or tools used for handling chemicals are made of a glass belonging to the class of so-called soda glass and are rather disadvantageous from the standpoint of contamination by the ingredients leached out of the surface even when they are used after the most careful cleaning treatment by dipping in a chromic acid mixture or in a strong alkali solution for several days to have the surfaces freed from the contaminants.

When the contamination from the vessels or tools must be minimized to an extremely low extent, several kinds of materials with little leaching out of the ingredients, such as borosilicate glass, high-silicate glass and fused quartz glass, are employed or, alternatively, a protective film of a fluorocarbon polymer is provided on the surface of the vessel or tool. These vessels or tools are, however, very expensive and they are not always suitable for industrial uses. Accordingly, it has long been desired to develop a simple and effective means with less expensive materials by which the leaching out of contaminants can be prevented regardless of the materials of the substrate solid surfaces.

SUMMARY OF THE INVENTION

Thus, it is an object of the present invention to provide a novel method for preventing leaching of contaminants from the surface of a solid to cause contamination of the materials in contact with the solid surface.

The present invention has been established on the basis of the discovery as a result of the extensive investigation undertaken by the inventors to solve the above described problem, according to which the exudation or leaching of the contaminants from the surface of any conventional vessels or tools can be effectively prevented by providing an oxidized film of silicon on the surfaces thereof by use of a coating solution as specified below.

The method of the present invention for preventing leaching of contaminants from the surface of a solid comprises (a) providing a coating layer on the surface of the solid with a coating solution containing a hydroxysilane compound represented by the general formula

 (I)

where R is a group selected from the class consisting of hydrocarbon groups, alkoxy groups and acyloxy groups and n is a number of 0, 1, 2 or 3, and (b) heating the thus coated solid at a temperature not lower than 150° C.

DETAILED DESCRIPTION OF THE PREFERRED EMBODIMENTS

As is understood from the above description, the hydroxysilane compound as the main ingredient of the coating solution used in the inventive method has at least one silanolic hydroxy group and represented by the above general formula (I). In the general formula (I), the groups denoted by R are each a group selected from the class consisting of hydrocarbon groups, alkoxy groups and acyloxy groups. When two or more of the groups R are present in a molecule, they may not be identical with each other.

The hydrocarbon group suitable as the group R is exemplified by alkyl groups such as methyl, ethyl, propyl and butyl groups, aryl groups such as phenyl group and alkenyl groups such as vinyl and allyl groups.

The alkoxy group suitable as R is exemplified by methoxy, ethoxy, propoxy, butoxy and pentoxy groups, of which the most preferred are methoxy and ethoxy groups. The acyloxy group suitable as R is exemplified by acetoxy and propionyloxy groups, of which acetoxy group is preferred.

In the preferred embodiments of the invention, the groups expressed by R are selected from the class consisting of alkoxy groups, e.g. methoxy and ethoxy groups, and acyloxy groups, e.g. acetoxy group so that the hydroxysilane compound can be represented by the general formula

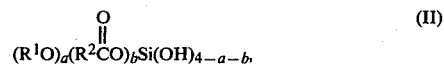 (II)

where, preferably, $R^1$ is a methyl or ethyl group; $R^2$ is a methyl group and a and b are each zero or a positive integer with the proviso that a+b is not exceeding 3.

The procedure for the preparation of the coating solution used in the inventive method is now described below.

First, for example, 1 mole of an alkoxysilane is admixed with 2 to 5 moles of a carboxylic acid and 2 to 10 moles of an alcohol together with a small amount of a reaction promotor. It is necessary that the amount of the alcohol is at least equimolar to the carboxylic acid. The reaction takes place even at room temperature with temperature elevation by the heat evolved in the exothermic reaction and an ester of the carboxylic acid and a hydroxysilane compound are formed, the latter being the hydrolysis product of the alkoxysilane compound with the water produced in the esterification reaction. It is usual that the starting alkoxysilane disappears within 2 to 5 hours from the start of the reaction and the amount of the carboxylic acid gradually decreases reaching 20% or smaller of the initial amount after 2 to 5 days at room temperature. When the content of the carboxylic acid has decreased to the extent as above, the reaction mixture is suitable as a coating solution since a reaction mixture containing an excessive amount of the carboxylic acid cannot spread evenly over the surface of various substrate materials. Thus the resultant hydroxysilane is a mixture of several types of the compounds represented by the general formula (II) above.

The second method for the preparation of the coating solution is the reaction of an acyloxysilane compound, which is obtained by the reaction of a carboxylic acid and a halogenosilane, with an alcohol to produce a hydroxysilane, in which some of the acyloxy groups in the starting acyloxysilane have been replaced with the alkoxy groups, and an ester of the carboxylic acid. In this case, at least 4 moles of an alcohol is employed per mole of the acyloxysilane which in turn is prepared by the reaction of one mole of a halogenated silane with 4 to 6 moles of the carboxylic acid.

It was noted in carrying out the reaction of an acyloxysilane with an alcohol that the carboxylic acid was first liberated from the acyloxysilane by the ester exchange with the alcohol followed by gradual decrease of the content of the carboxylic acid by the esterification reaction with the remaining portion of the alcohol. When the content of the carboxylic acid has decreased to 20% or less of the theoretical amount calculated on the assumption that 4 moles of the carboxylic acid are liberated from 1 mole of the acyloxysilane, the reaction is complete and the reaction mixture is suitable for use as the desired coating solution. The reaction is complete within about 48 hours at room temperature but may be accelerated by heating.

In the third method for the preparation of the coating solution, an alkoxysilane, water and a monovalent alcohol, e.g. methyl alcohol, ethyl alcohol, propyl alcohol, butyl alcohol and amyl alcohol, are blended together with a small amount of a reaction promotor. The mixing ratios of the water and the alcohol to the alkoxysilane are 2 to 5 moles of water and 3 to 30 moles of the alcohol per mole of the alkoxysilane.

The alkoxysilane compound used in the first and the third methods is exemplified by orthomethylsilicate, methylitriethoxysilane, orthoethylsilicate, ethyltriethoxysilane, orthopropylsilicate, orthobutylsilicate, tetraphenoxysilane, vinyltrimethoxysilane, vinyltriethoxysilane and the like.

The reaction promotors used in the above reactions are exemplified by several inorganic and organic acids such as hydrochloric acid, sulfuric acid, nitric acid, carbonic acid, hydrogen bromide, perchloric acid, phosphoric acid, boric acid, oxalic acid, citric acid, salicylic acid, picric acid, maleic acid, chloroacetic acid and benzenesulfonic acid as well as salts and oxides of several metallic elements such as gold chloride, zinc chloride, aluminum chloride, iron chloride, copper chloride, nickel chloride, chromium chloride, arsenic chloride, antimony chloride, tin chloride, gallium chloride, indium chloride, platinum chloride, titanium tetrachloride, copper sulfate, zinc sulfate, lead nitrate, zinc nitrate, aluminum nitrate, iron nitrate, copper nitrate, nickel nitrate, indium nitrate, boron oxide, phosphorus pentoxide, arsenic trioxide and the like. Preferred reaction promotors are hydrochloric acid, nitric acid, sulfuric acid, phosphoric acid, boric acid and carbonic acid.

These reaction promotors are used in an amount of 0.001 to 20% be weight based on the amount of the alkoxysilane or acyloxysilane according to the desired reaction velocity.

The proceeding of the reaction in the reaction mixture formulated as described above can readily to traced by means of gas chromatography, infrared absorption spectroscopy and other suitable methods and the formation of hydroxy-containing silane compounds can be detected. When an equilibrium of the esterification reaction or the transesterification reaction has been established in the reaction mixture, the reaction mixture can be used as a stable coating solution with which various kinds of substrate surfaces are provided with a smooth and uniformly spreading film of the oxidation product of silicon with subsequent heating.

It is of course optional that the reaction mixture is diluted with a suitable organic solvent to have a viscosity or consistency suitable for application to the substrate surfaces and, if necessary, the solution is filtered with a filter having micropores of a diameter of 1 $\mu$m or smaller.

The diluent solvent as mentioned above is not limitative in so far as it can dissolve all of the constituents in the reaction mixture and spread uniformly over the surface of the solid substrate to which the solution is applied depending on the kind of the material of the solid and is exemplified by alcohols, ketones, polyvalent alcohols and esters thereof and $\beta$-diketones as well as mixtures thereof. Alcohols are exemplified by methyl alcohol, ethyl alcohol, propyl alcohol, butyl alcohol, amyl alcohol and the like, esters are exemplified by methyl acetate, ethyl acetate, propyl acetate, butyl acetate and the like, ketones are exemplified by acetone, methyl ethyl ketone, methyl isobutyl ketone, cyclohexanone and the like, and polyvalent alcohols and esters thereof are exemplified by ethyleneglycol, ethyleneglycol monomethyl ether, ethyleneglycol monoethyl ether, ethyleneglycol diethyl ether, ethyleneglycol monoisopropyl ether, ethyleneglycol monobutyl ether, ethyleneglycol dibutyl ether, propyleneglycol, glycerine and the like. The concentration of the coating solution upon dilution with the organic solvent is usually in the range from 1 to 20% by weight calculated as $SiO_2$.

The material of the objective solid articles to be coated with the thus prepared coating solution includes glass, ceramics, mica, metals, e.g. stainless steel, plastics and the like and the shapes of the articles are not limitative including plates, rods, tubes, balls, bottles and any other irregular forms.

The coating procedure with the coating solution is conventional according to the shapes of the objective articles including dipping method, spraying method, pouring method, brushing and the like. The solid article coated with the coating solution is then subjected to air-drying to remove the solvent or solvents by evaporation to leave a coating film of a hydroxy-containing silane compound which is further converted to a film of oxidized silicon by the silanol condensation between the hydroxy groups when kept standing in atmospheric air or further baked at 150° C. or higher.

The baking temperature is preferably as high as possible in so far as the material of the solid substrate can withstand in order to enhance the hardness of the baked film of the oxidized silicon. The length of the baking treatment is also as long as possible but it is usually in the range from 10 to 60 minutes from the standpoint of working efficiency. It is sometimes advisable to admix the coating solution with a vitrification promotor such as phosphorus pentoxide and boron oxide in an amount smaller than 10% by weight of the $SiO_2$ content in the solution so as that the baking temperature may be decreased. The addition of these vitrifying agents is recommendable only when the presence of such an ingredient is not undesirable.

In practicing the above described method of the invention, the surface of the solid substrate, e.g. inner walls of a vessel, is provided with a continuous coating film having a thickness of 0.1 to 1.0 μm and having no pin-holes composed of high purity oxidized silicon readily and economically so that the exudation or leaching out of contaminants from the solid surface can be effectively prevented giving advantages in various industrial applications.

In the following, the method of the present invention is further illustrated in detail by way of examples.

EXAMPLE 1

Into a mixture composed of 152 g of orthomethylsilicate, 240 g of glacial acetic acid and 240 g of methyl alcohol kept at room temperature was added 10 g of finely pulverized oxalic acid with agitation. The reaction took place exothermically and the temperature of the reaction mixture increased to about 40° C. as the reaction proceeded. The gas chromatographic and infrared absorption spectral analyses indicated the formation of large amounts of methyl acetate and hydroxy-containing silane compounds.

After standing at room temperature for 3 days, the reaction mixture was analyzed for the solid content which was found to be 12.5% by weight as measured by heating at 140° C. for 3 hours. The reaction mixture was diluted by adding isopropyl alcohol to give a solid content of 5.9% weight followed by filtration with a filter having micropores of 0.45 μm diameter to give a coating solution.

The impurity levels of several metallic elements in the coating solution were determined by atomic absorption spectrophotometry to give the results below.

| Impurity element | Na | K | Ca | Mg | Zn | Al | Fe | Cu |
|---|---|---|---|---|---|---|---|---|
| Concentration, p.p.m. | 0.01 | 0.05 | 0.1 | 0.1 | 0.1 | 0.1 | 0.1 | 0.1 |

About 50 ml of the thus prepared coating solution was introduced into a narrow-necked glass bottle of 1,000 ml capacity and whole surface of the inner wall of the bottle was wetted with the solution by tumbling the bottle followed by discharging of the solution and dripping of the excessive solution by keeping the bottle upside down for a while. After spontaneous evaporation of the solvent for about 30 minutes, the bottle was gradually heated up to a temperature of 500° C. where it was kept for 30 minutes followed by gradual cooling to room temperature. The resultant thin film of silicon dioxide formed on the inner walls of the glass bottle had a thickness of about 0.2 μm.

Several of the physical and chemical properties of the above obtained coating film were as follows as determined with a glass plate with the same coating solution simulating the above described coating procedure.

| | |
|---|---|
| Refractive index | 1.44 |
| Dielectric constant | 4.0 |
| Thermal expansion coefficient | $5 \times 10^{-7}$/°C. |
| Sheet resistance | $1 \times 10^{15}$ ohm/□ |
| Velocity of etching | 100 Å/second (1 molar HF, 25° C.) |

Comparisons were made for the leaching velocity of the ingredients in the glass bottle from the surface between the bottles coated with silicon dioxide as described above and uncoated bottles. Thus, each of the bottles, having been subjected to the cleaning treatment by dipping in a 5% hydrochloric acid solution for 2 hours, followed by rinsing with deionized water and drying, was filled with methyl alcohol, acetone or butyl acetate and kept at 25°–27° C. for weeks. Small portions of the solvent were taken periodically and analyzed for the concentration of the sodium ions leached out of the glass surface along with the measurement of the electric conductivity at 25° C. The results are summarized in Table 1 below.

TABLE 1

| Solvent | | Glass bottle | Initial | After 3 weeks | After 6 weeks | After 9 weeks | After 12 weeks | After 15 weeks |
|---|---|---|---|---|---|---|---|---|
| Methyl alcohol | Concentration of Na ions, p.p.m. | Uncoated | 0.02 | 0.07 | 0.08 | 0.09 | 0.10 | 0.4 |
| | | Coated | | 0.02 | 0.02 | 0.02 | 0.02 | 0.03 |
| | Electric conductivity, μmho/cm | Uncoated | 0.6 | 0.7 | 0.8 | 0.9 | 1.0 | 2.1 |
| | | Coated | | 0.6 | 0.6 | 0.6 | 0.6 | 0.7 |
| Acetone | Concentration of Na ions, p.p.m. | Uncoated | 0.03 | 0.04 | 0.05 | 0.07 | 0.09 | 0.20 |
| | | Coated | | 0.03 | 0.03 | 0.03 | 0.03 | 0.03 |
| | Electric conductivity, μmho/cm | Uncoated | 0.6 | 0.6 | 0.6 | 0.7 | 0.9 | 1.3 |
| | | Coated | | 0.6 | 0.6 | 0.6 | 0.6 | 0.6 |
| Butyl acetate | Concentration of Na ions, p.p.m. | Uncoated | 0.04 | 0.06 | 0.07 | 0.09 | 0.14 | 0.20 |
| | | Coated | | 0.04 | 0.04 | 0.04 | 0.04 | 0.04 |
| | Electric conductivity, μmho/cm | Uncoated | 0.4 | 0.4 | 0.4 | 0.5 | 0.7 | 1.2 |
| | | Coated | | 0.4 | 0.4 | 0.4 | 0.4 | 0.4 |

EXAMPLE 2

Tetraacetoxysilane was prepared by the reaction of 125 g of silicon tetrachloride and 400 g of acetic acid as blended and stirred at room temperature. When the evolution of hydrogen chloride gas had ceased with precipitation of white crystalline tetraacetoxysilane, the unreacted acetic acid was removed by stripping under a reduced pressure and the residue was dissolved in 300 g of ethyl alcohol. The reaction between the tetraacetoxysilane and ethyl alcohol was carried out by heating the above reaction mixture at 60° C. with agitation for 10 hours. The formation of large amounts of ethyl acetate and hydroxy-containing silane compounds was detected in the resultant reaction mixture which had a solid content of 5.9% by weight upon dilution by adding 120 g of ethyl alcohol.

The reaction mixture was further diluted by adding n-butyl alcohol to a solid content of 3.0% and the solution was filtered with a filter having micropores of 0.45 μm diameter to give a coating solution.

A container of 20 liter capacity made of 18-8 stainless steel was coated with the above prepared coating solution on the inner walls by spraying followed by heating treatment at 400° C. for 60 minutes.

The thus coated container was filled with a 5% hydrochloric acid and kept standing at room temperature for 10 days and the hydrochloric acid was analyzed for the concentration of metallic elements to give a result that no noticeable amounts of nickel, chromium and iron were dissolved out of the container.

EXAMPLE 3

Into a mixture composed of 209 g of orthoethylsilicate, 54 g of water and 572 g of ethyl alcohol was added 0.5 g of 35% hydrochloric acid with agitation. The reaction took place and proceeded with evolution of heat. The analysis undertaken with the reaction mixture after standing a room temperature for 3 days indicated formation of large amounts of hydroxy-containing silane compounds.

The reaction mixture containing 9.0% by weight of solid as measured by heating at 140° C. for 3 hours was diluted by adding acetone to a solid content of 8.0% by weight followed by filtration with a filter having micropores of 0.45 μm diameter to give a coating solution.

A glass plate having dimensions of 80 mm×120 mm×0.7 mm was dipped in the thus prepared coating solution and then pulled up at a velocity of 30 cm per minute to be coated with the solution and the coated glass plate was subjected to drying at 100° C. for 15 minutes and then baking at 500° C. for 60 minutes to form a coating film of oxidized silicon having a thickness of 0.15 μm.

Leaching test of sodium ions was undertaken with the thus coated glass plate and a similar glass plate before coating by dipping them separately for 10 minutes in 900 ml of diluted hydrochloric acid of 10% concentration at 60° C. in a beaker of fused quartz glass after washing with 5% hydrochloric acid for 5 minutes.

The concentration of sodium ions in the hydrochloric acid after leaching was determined by atomic absorption spectrophotometry taking the starting hydrochloric acid as the reference to give a result that the concentration or rather the increment of the concentration of sodium ions in the acid in which the coated glass plate was dipped was 0.01 p.p.m. while the value for the uncoated glass plate was 0.34 p.p.m.

What is claimed is:

1. A method of preventing leaching of a contaminant from the surface of a solid which comprises
   (a) providing a coating layer on the surface of the solid with a coating solution containing a hydroxysilane compound represented by the general formula $$R_nSi(OH)_{4-n}$$

where R is a group selected from the class consisting of hydrocarbon groups, alkoxy groups and acyloxy groups and n is a number of 0, 1, 2 or 3, and
   (b) heating the thus coated solid under oxidizing conditions at a temperature not lower than 150° C. to form on the surface a coating film of oxidized silicon which prevents leaching, and wherein the hydroxysilane compound is a reaction product of an acyloxysilane with an alcohol.

2. The method as claimed in claim 1 wherein the acyloxysilane is an acetoxysilane.

3. The method as claimed in claim 1 wherein the amount of the alcohol is at least 4 moles per mole of the acyloxysilane.

4. The method as claimed in claim 1 wherein the heating in the step (b) is carried out for at least 10 minutes.

5. The method as claimed in claim 1 wherein the coating film of the oxidized silicon has a thickness of at least 0.1 μm.

6. A method according to claim 1 wherein said step (b) of heating comprises heating the coated solid in air.

7. A method of preventing leaching of a contaminant from the surface of a solid which comprises
   (a) providing a coating layer on the surface of the solid with a coating solution containing a hydroxysilane compound represented by the general formula $$R_nSi(OH)_{4-n}$$

where R is a group selected from the class consisting of hydrocarbon groups, alkoxy groups and acyloxy groups and n is a number of 0, 1, 2 or 3, and
   (b) heating the thus coated solid under oxidizing conditions at a temperature not lower than 150° C. to form on the surface a coating film of oxidized silicon which prevents leaching, and wherein the hydroxysilane compound is a reaction product of a tetraalkoxysilane with water in an alcohol.

8. The method as claimed in claim 7 wherein the amounts of water and the alcohol are in the ranges from 2 to 5 moles and from 3 to 30 moles per mole of the tetraalkoxysilane, respectively.

* * * * *